United States Patent
Kaushik et al.

(10) Patent No.: US 12,095,730 B2
(45) Date of Patent: Sep. 17, 2024

(54) CONTROLLING ACCESS TO RESOURCES BASED ON POLICIES AT DIFFERENT LAYERS OF A NETWORKING MODEL

(71) Applicant: Quick Heal Technologies Limited, Pune (IN)

(72) Inventors: Anil Kaushik, Bangalore (IN); Bibhuti Bhusan Kar, Bangalore (IN)

(73) Assignee: Quick Heal Technologies Limited, Maharashtra (IN)

( * ) Notice: Subject to any disclaimer, the term of this patent is extended or adjusted under 35 U.S.C. 154(b) by 213 days.

(21) Appl. No.: 17/647,014

(22) Filed: Jan. 5, 2022

(65) Prior Publication Data

US 2023/0073086 A1 Mar. 9, 2023

(30) Foreign Application Priority Data

Sep. 3, 2021 (IN) .............................. 202121039917

(51) Int. Cl.
*H04L 29/06* (2006.01)
*G06F 9/54* (2006.01)
*H04L 9/40* (2022.01)

(52) U.S. Cl.
CPC ............ *H04L 63/0245* (2013.01); *G06F 9/54* (2013.01); *H04L 63/10* (2013.01); *H04L 63/20* (2013.01)

(58) Field of Classification Search
CPC ......... H04L 63/10; H04L 63/20; H04L 63/16; H04L 63/105; H04L 63/0245; H04L 63/0263
USPC ............................................................ 726/1
See application file for complete search history.

(56) References Cited

U.S. PATENT DOCUMENTS

| | | | |
|---|---|---|---|
| 9,661,522 B2 | 5/2017 | Kavunder et al. |
| 9,736,057 B2 | 8/2017 | Chinni et al. |
| 10,171,423 B1 | 1/2019 | Woodberg et al. |
| 2008/0077705 A1 | 3/2008 | Li et al. |

(Continued)

FOREIGN PATENT DOCUMENTS

| | | | |
|---|---|---|---|
| CA | 30-43576 | * | 5/2018 |
| EP | 1298529 A2 | | 4/2003 |

(Continued)

OTHER PUBLICATIONS

A Day in the Life of a (Secure) Request, https://full-stack.blend.com/a-day-in-the-life-of-a-secure-request.html, Downloaded circa Jul. 27, 2021, 11 Pages.

(Continued)

*Primary Examiner* — Longbit Chai
(74) *Attorney, Agent, or Firm* — IPHORIZONS PLLC; Narendra Reddy Thappeta

(57) ABSTRACT

Aspects of the present disclosure are directed to controlling access to resources in a network. In an embodiment, a gateway system receives a packet requesting access to a resource in the network, and identifies access control policies to be applied in determining whether or not to permit access to said first resource. The gateway system applies a higher-layer policy and then a lower-layer policy on the packet to determine whether or not to forward the packet to the network and forwards the packet to the network only if it is determined to forward the packet. The higher-layer policy and lower-layer policies are according to respective layers of a networking model.

20 Claims, 10 Drawing Sheets

(56) References Cited

U.S. PATENT DOCUMENTS

| | | | |
|---|---|---|---|
| 2016/0294774 A1* | 10/2016 | Woolward | H04L 63/1491 |
| 2018/0316725 A1* | 11/2018 | Mani | H04L 67/125 |
| 2019/0141015 A1 | 5/2019 | Nellen | |
| 2021/0067538 A1 | 3/2021 | Mishra et al. | |

FOREIGN PATENT DOCUMENTS

| | | |
|---|---|---|
| JP | 2008507929 A | 3/2008 |
| WO | WO2021016869 A1 | 2/2021 |

OTHER PUBLICATIONS

Load Balancing Zadara VPSA Object Storage (ZIOS), https://www.zadara.com/wp-content/uploads/Zadara_Object_Storage_Deployment_Guide.pdf, Downloaded circa Jul. 27, 2021, 27 Pages.

L4-L7 Service Function Chaining Solution Architecture, Jun. 14, 2015, 36 Pages.

\* cited by examiner

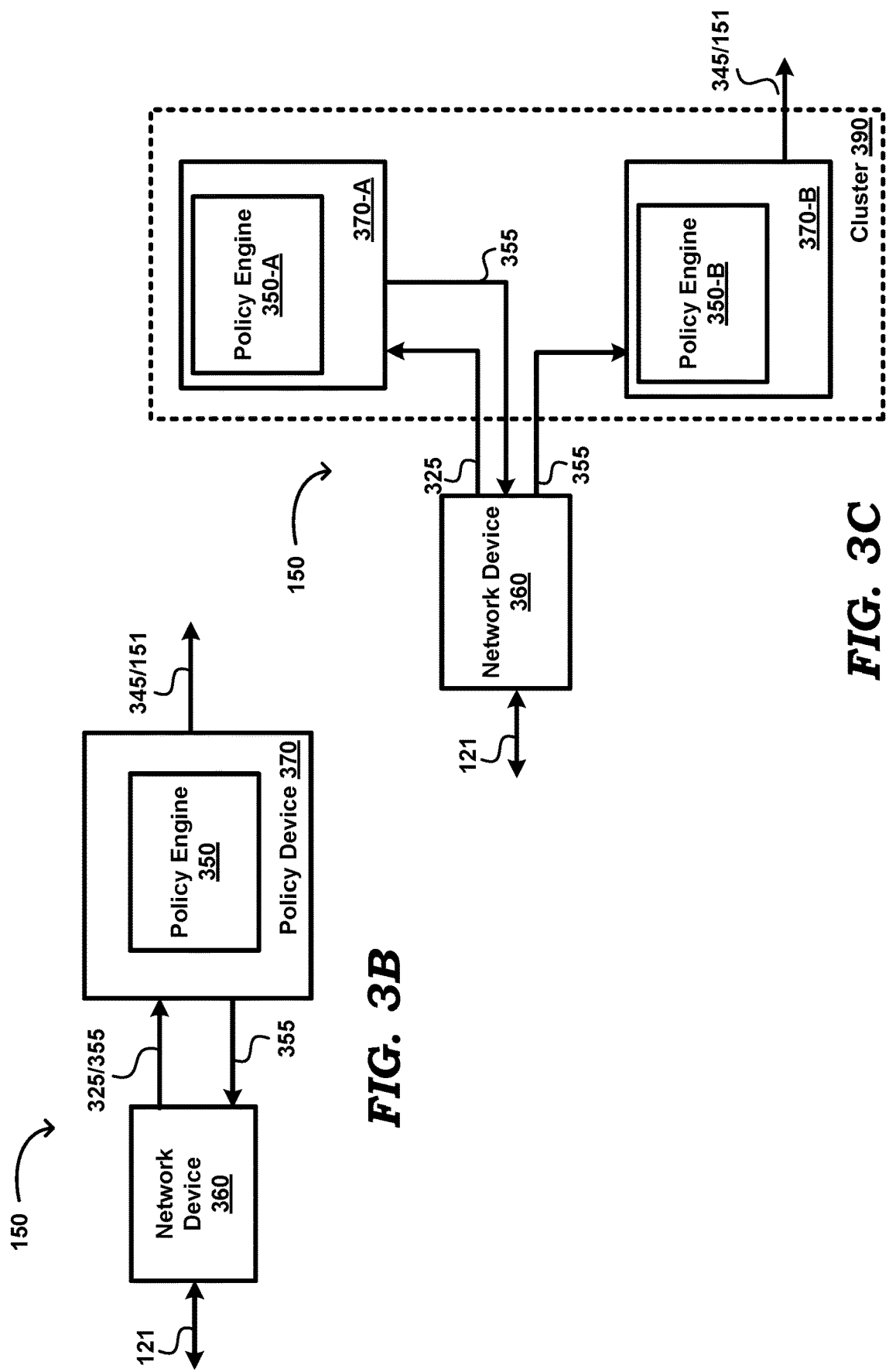

| | Policy Id 511 | Resource 512 | Condition 513 | Action 514 | Layer 515 |
|---|---|---|---|---|---|
| 551 → | P101 | /homepage | User:Any | ALLOW | L7 |
| 552 → | P102 | /admin | UserGroup: [Administrator] | ALLOW | L7 |
| 553 → | P103 | / | Destination IP between: {50.10.20.1, 50.10.20.255} Port: [80] | ALLOW | L4 |
| 554 → | P104 | / | Source IP between: {1.45.0.0, 1:45.255.255} Port: [555...655] | DENY | L4 |

CONTROLLING ACCESS TO RESOURCES BASED ON POLICIES AT DIFFERENT LAYERS OF A NETWORKING MODEL

PRIORITY CLAIM

The instant patent application is related to and claims priority from the India provisional patent application entitled, "Access Control in Zero Trust Network Access", Serial No. 202121039917, Filed: 3 Sep. 2021, naming as inventors Kaushik et al, which is incorporated in its entirety herewith.

BACKGROUND OF THE DISCLOSURE

Technical Field

The present disclosure relates to network security, and more specifically to controlling access to resources based on policies at different layers of a networking model.

Related Art

Resources are provided based on computing infrastructures constituted of processors, memory, communication devices, etc., as is well known in the relevant arts. In general, a resource refers to a thing of the computing infrastructure that can be accessed and used by users according to pre-specified conventions. Examples of resources include web services, software applications, files, data, etc.

Access to resources is generally provided based on networking models implemented cooperatively on various nodes between (and including) a user system (used by a user) and a host system on which the resource of interest is accessible. Examples of networking models are OSI (Open Systems Interconnection) developed by ISO (International Organization for Standardization,) and TCP/IP (Transmission Control Protocol/Internet Protocol) developed by IETF (Internet Engineering Task Force).

Layers form the basis for definition and implementation of each networking model, as is also well known in the relevant arts. A layer specifies a convention for communication between two peer nodes connected by a network and/or with an adjacent layer on the same node. As is well known in the relevant arts, the OSI model has seven layers, namely, physical (lowest), data link, network, transport, session, presentation and application layers (highest). Similarly, TCP/IP also has corresponding similar layers including networking (IP) layer and transport (TCP) layer.

Access to resources is often controlled using policies at different layers. For example, user systems at only certain IP addresses may be permitted access to a resource by having a policy at a networking layer. Another policy may be based on higher layers such as a session layer (e.g., ports of TCP layer), etc., as is also well known in the relevant arts.

Aspects of the present disclosure are directed to controlling access to resources based on policies at different layers of a networking model.

BRIEF DESCRIPTION OF THE DRAWINGS

Example embodiments of the present disclosure will be described with reference to the accompanying drawings briefly described below.

FIG. 3B is a block diagram illustrating an alternative implementation of a gateway system using a policy device and a network device.

FIG. 3C is a block diagram illustrating an alternative implementation of a gateway system using a cluster of policy devices and a network device.

FIG. 5 depicts portions of policy data used by policy engine for identifying policies for controlling access to resources in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
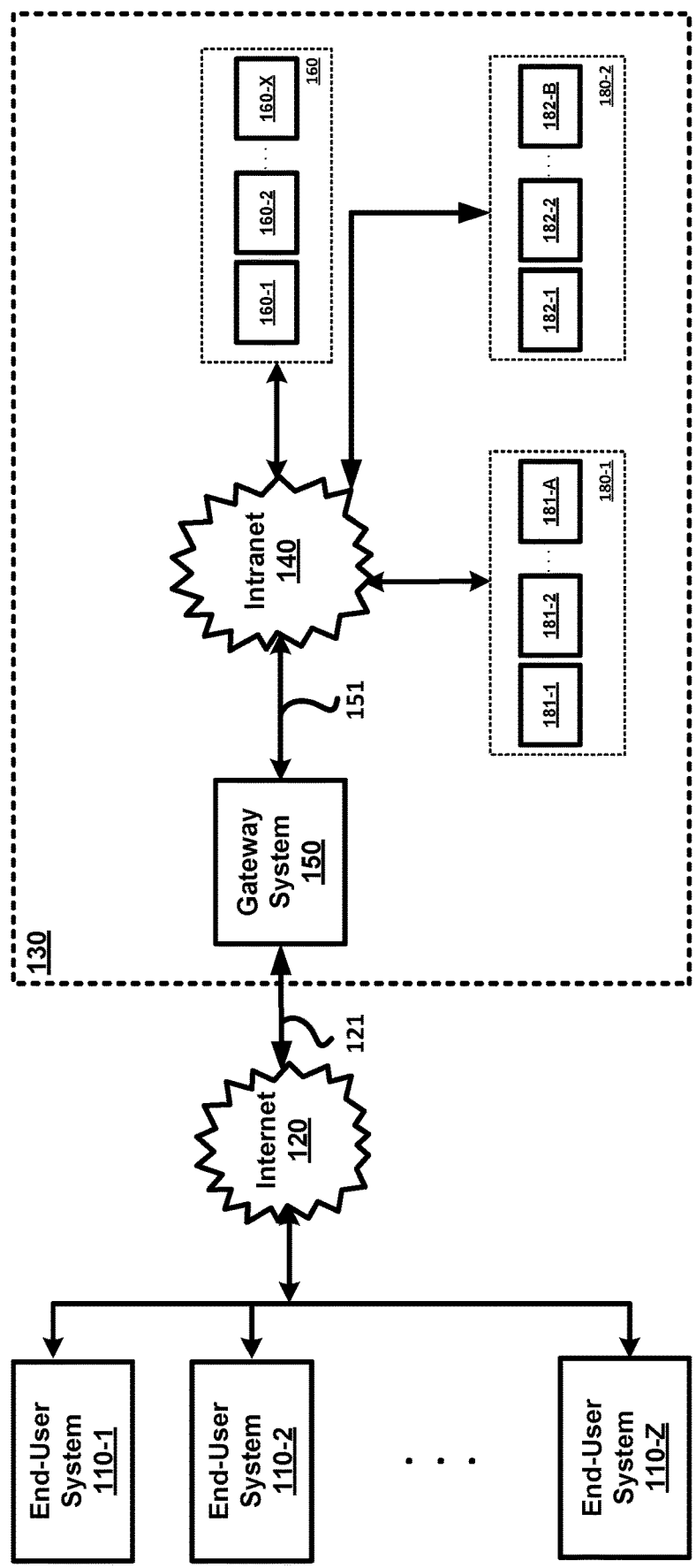
FIG. 1 is a block diagram illustrating an example environment (computing system) in which several aspects of the present disclosure can be implemented.

Aspects of the present disclosure are directed to controlling access to resources in a network. In an embodiment, a gateway system receives a packet requesting access to a resource in the network, and identifies access control policies to be applied in determining whether or not to permit access to the resource. The gateway system applies a higher-layer policy and then a lower-layer policy on the packet to determine whether or not to forward the packet to the network and forwards the packet to the network only if it is determined to forward the packet. The higher-layer policy and lower-layer policies are according to respective layers of a networking model.

In an embodiment, the higher layer is an application layer and the lower layer is one of a presentation layer, a session layer, a transport layer, a network layer, a data link layer and a physical layer according to the networking model, and the network is a zero trust network.

According to an aspect of the present disclosure, a policy data specifying policies for corresponding resources is maintained. Each policy is associated with a corresponding layer in the networking model. In response to receiving the packet, a first iteration of identifying and applying is performed to identify and apply a first set of higher-layer policies. The packet is then redirected to the gateway system if it is determined to permit access to the resource based on applying the first set of higher-layer policies. In response to receiving the redirected packet, a second iteration of identifying and applying is performed to identify and apply a second set of lower-layer policies. The packet is forwarded if it is determined to permit access to the resource based on applying the second set of lower-layer policies.

According to another aspect of the present disclosure, the packet is received according to a first network protocol at a first port of the gateway system, the redirecting redirects the packet according to a second network protocol and the redirected packet is received at a second port of the gateway system.

According to one more aspect of the present disclosure, the gateway system is a reverse proxy, and a first listener listens on the first port according to the first network protocol, performs the first iteration and performs the redirecting while a second listener listens on the second port according to the second network protocol, performs the second iteration and performs the forwarding. Thus, the redirecting is achieved in-memory using the first listener and the second listener.

According to yet another aspect of the present disclosure, the gateway system contains a policy device and a network device. The packet is received at the network device and sent to the policy device by the network device. The policy device performs the first iteration and redirects the packet to the network device. The network device sends the redirected packet to policy device. In response to receiving the redirected packet, the policy device performs the second iteration and forwards the packet to the network if it is determined to permit access to the resource.

According to another aspect of the present disclosure, a first application service is invoked after performing the first iteration, and the redirecting is performed upon completion of execution of the first application service. A second application service is invoked after performing the second iteration the forwarding is performed upon completion of execution of the second application service.

According to one more aspect of the present disclosure, the packet is forwarded to a higher-layer load balancer after performing the first iteration, and the packet is forwarded to a lower-layer load balancer after performing the second iteration, whereby load balancing is achieved at both higher-layer and lower-layer.

According to an aspect of the present disclosure, in response to the first iteration or the second iteration, the packet is sent to a honeypot if it is determined that the packet is not to be forwarded to the network.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing end-user systems 110-1 through 110-Z (Z representing any natural number), Internet 120 and computing infrastructure 130. Computing infrastructure 130 in turn is shown containing gateway system 150, private network 160 and enterprise locations 180-1 and 180-2. Private network 160 is shown containing various digital systems 160-1 to 160-X (X representing any natural number). Enterprise location 180-1 is shown containing digitals systems 181-1 through 181-A, while enterprise location 180-2 is shown containing digital systems 182-1 through 182-B (A and B representing any natural number). The end-user systems, digital systems and enterprise locations are collectively or individually referred to by 110, 160/181/182 and 180 respectively, as will be clear from the context.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes that may include processing nodes, connectivity infrastructure, data storages, administration systems, etc., which are engineered to together host software applications. Computing infrastructure 130 may correspond to a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

In one embodiment, multiple private networks (as indicated by respective dotted boundaries) are provisioned using the nodes of computing infrastructure 130, with the nodes in each private network referred to as digital systems in the disclosure herein. For example, private network 160 is shown containing digital systems 160-1 to 160-X.

Some of the private networks may be located remotely spanning one or more distinct physical locations. Enterprise locations 180-1 and 180-2 represent two such remote private networks that are provisioned in computing infrastructure 130. It may be appreciated that in alternative embodiments, such remote private networks may be provisioned across multiple computing infrastructures (different from 130), as will be apparent to one skilled in the relevant art.

Intranet 140 represents a network providing connectivity between nodes of computing infrastructure 130, specifically between the private networks provisioned on the nodes. Internet 120 extends the connectivity of these (and other systems of the computing infrastructure) with external systems such as end-user systems 110 via gateway system 150. Internet 120 may be implemented using protocols such as TCP and/or IP, well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120. When the packet contains content such as port numbers, which specifies a target application, the packet may be said to be directed to such an application as well.

Each of end-user systems 110 represents a system such as a personal computer, workstation, mobile device, computing tablet etc., used by users to generate user requests directed to various software applications hosted in computing infrastructure 130. The user requests may be generated by users using appropriate user interfaces (e.g., web pages provided by an application executing in a digital system, a native user interface provided by a portion of an application downloaded from a digital system, etc.).

In general, an end-user system requests a software application to perform desired tasks and receives the corresponding responses (e.g., web pages) containing the results of performance of the requested tasks. The web pages/responses may then be presented to a user by a client application such as the browser. Each user request may be sent in the form of one or more of IP packets directed to the desired system or software application, with the IP packets including data identifying the desired tasks in the payload portion.

Some of digital systems 160/181/182 may be implemented as corresponding data stores. Each data store represents a non-volatile (persistent) storage facilitating storage and retrieval of enterprise data (resources) by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of digital systems 160/181/182 may be implemented as corresponding server systems. Each server system represents a server, such as a web/application server, constituted of appropriate hardware executing software applications/services capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In the following disclosure, the users using end-user systems 110 are viewed as accessing various resources hosted in computing infrastructure 130 (specifically by digital systems 160/181/182). A resource may be a web application hosted on one of digital systems 160/181/182 implemented as corresponding web/application server, data stored in digital systems 160/181/182 implemented as corresponding data stores, or tasks executed by software applications/services hosted in computing infrastructure 130.

Each resource hosted in computing infrastructure 130 may be identified using a URL (Universal Resource Locator) or a URI (Uniform Resource Identifier), as is well known in the relevant arts. Though the embodiments below are described with respect to primarily using URLs to identify resources, it may be appreciated that the same aspects of the present disclosure are applicable to other naming techniques used to identify resources hosted in computing infrastructure 130. The user requests sent by users may be viewed as corresponding access requests that request access to specific resources hosted in computing infrastructure 130. Each user/access request may accordingly include the URLs of the resources sought to be accessed.

Gateway system 150 represents a networking system (part of connectivity infrastructure) that operates to control access to resources hosted in computing infrastructure 130. Broadly, gateway system 150 is designed to intercept packets received from external systems (such as end-user systems 110) over Internet 120, and forward the packets to target digital systems (hosted in computing infrastructure 130).

Access to resources is typically controlled using policies at different layers of a networking model (such as OSI). In addition to controlling access to resources, gateway system 150 may perform other operations such as authentication, destination lookup, etc. Gateway system 150 after applying the relevant policies, forwards the packets to one of digital systems 160/181/182 in computing infrastructure 130, and receives corresponding responses from the digital system. Gateway system 150 sends the responses to respective end-user system 110 that initiated the access request.

Thus, gateway system 150 operates to control the flow of data from one discrete network (such as from Internet 120) to another (e.g., enterprise location 180). In one embodiment, gateway system 150 performs such control of the flow of data using tunnelling, as is well known. A tunnel is realized by implementation of a communication protocol that allows movement of data (e.g., for accessing resources) securely from one network (typically public such as Internet 120) to another (private such as intranet 140). Examples of such communication protocols include IPSec and GRE (Generic Routing Encapsulation).

In an embodiment, computing infrastructure 130 is based on zero trust security. Zero trust security operates on the requirement that a user is allowed to access resources within computing infrastructure 130 with explicit access grant and authorization for each access request. Access control in zero trust security is based on policies associated with computing infrastructure 130.

As noted above, policies may be specified at different layers of the networking model, and packets are filtered (permitted to the network or denied) based on applying policies. It is generally desirable that such access policies defined at multiple layers, be efficiently applied within gateway system 150. Aspects of the present disclosure are directed to such a technical problem.

3. Controlling Access to Resources Based on Policies

Figure 2:
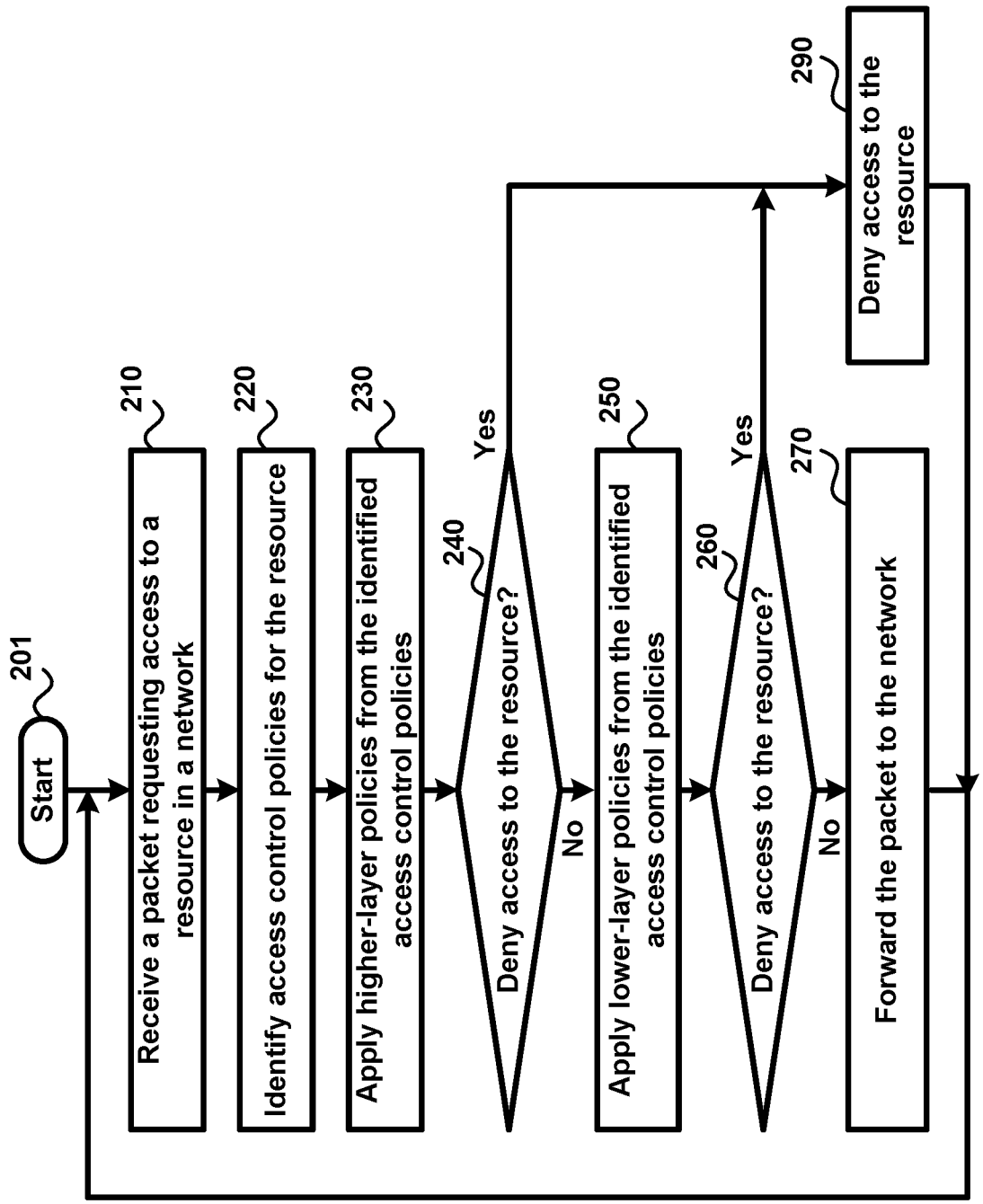
FIG. 2 is a flowchart illustrating the manner in which access to resources is controlled based on policies at different layers according to an aspect of the present disclosure.

FIG. 2 is a flowchart illustrating the manner in which access to resources is controlled based on policies at different layers of a networking model, according to an aspect of the present disclosure. The flowchart is described with respect to gateway system 150 of FIG. 1 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flowchart begins in step 201, in which control immediately passes to step 210.

In step 210, gateway system 150 receives a packet from end-user system 110 requesting access to a resource in a private network (e.g., in computing infrastructure 130). As noted above, the packet may be a TCP/IP packet specifying a target resource in the form of an URL. In general, each packet has a payload that specifies the request (including the URL of the target resource), and header data according to the applicable networking protocol.

In step 220, gateway system 150 identifies access control policies to be applied for the resource. The applicable policies may be identified by checking if the target resource specified in the packet matches with the resource specified as part of the policy. As noted above, the target resource may be specified using URL, although other naming techniques may be employed. The applicable policies may be at different layers of the networking model. Gateway system 150 may first authenticate the user initiating access request from end-user system 110. After successful authentication, gateway system 150 identifies policies to be applied for the resource.

In step 230, among the identified policies, gateway system 150 applies higher-layer policies on the packet. A higher-layer policy represents a policy which is based on attributes specified at the higher-layer in the packet. The determination of higher-layer policies may be performed based on the attributes specified in the policy. Alternatively, each policy may indicate the specific layer to which the policy is applicable.

Applying a policy on a packet entail examining the contents of the packet (including the request) as against the conditions specified in the policy to determine course of action to be undertaken on the request/packet. In an embodiment, the course of action could be one of permitting or denying access to the requested resource.

In step 240, gateway system 150 checks if access to the resource is to be denied based on the course of action so determined. Control passes to step 290 if access is to be denied (value YES) and to step 250 otherwise (value NO).

In step 250, among the identified policies, gateway system 150 applies lower-layer policies on the packet. A lower-layer policy represents a policy which is based on attributes specified at the lower layer in the packet. The determination of the lower-layer policies may be performed similar to the determination of the higher-layer policies.

In an embodiment of the present disclosure, the higher layer is application layer of the OSI model and the lower layer is one of presentation layer, session layer, transport layer, network layer, data link and physical layer. Thus, attributes specified at the higher-layer of the packet may include URLs, HTTP-headers, etc., and attributes specified at the lower layer may include source IP, destination IP (network layer), source port, and destination port (transport layer).

In step 260, gateway system 150 checks if access to the resource is to be denied. Control passes to step 290 if access is to be denied (value YES) and to step 270 otherwise (value NO).

In step 270, gateway system 150 provides access to the resource by forwarding the packet to the network. Specifically, if it is determined to forward the packet, gateway system 150 may forward the packet to an appropriate digital system (via intranet 140) in computing infrastructure 130, determined in a known way based on the attributes (e.g., combination of IP addresses and/or port numbers) of the received packet. Control passes to step 210, where more packets are received and processed in the manner described above.

In step 290, gateway system 150 denies access to the resource. Gateway system 150 may deny access to the resource, for example by dropping the packet and/or responding back with an appropriate error message (indicating denial of access). In either case of dropping or forwarding, additional operations such as reporting packet details to administrator, logging packet, etc., may be performed. Control passes to step 210, where more packets are received and processed in the manner described above.

Thus, the flowchart of FIG. 2 operates to control access to resources based on policies at different layers of networking model. It may be appreciated that higher-layer policies generally permit policies to span resources at broader level (e.g., for a department/private network), compared to lower-layer policies, where control is at a granular level (e.g., for a digital system). Applying higher-layer policies first may thus enable to efficiently implement security by enabling to decide a forwarding or denial action quickly. Therefore, applying higher-layer policies first may be advantageous at least for such a reason.

The manner in which access control can be provided according to the operation of FIG. 2 in various configurations is described below with examples.

4. Example Implementation

Figure 3A:
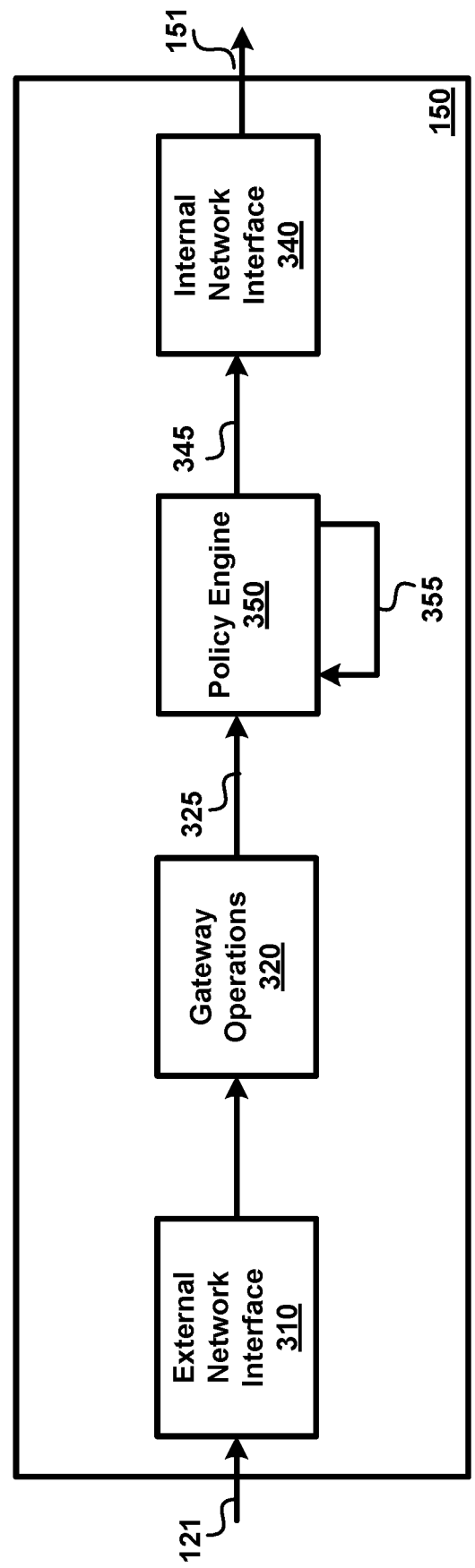
FIG. 3A is a block diagram illustrating an example implementation of a gateway system.

FIG. 3A is a block diagram illustrating an example implementation of a gateway system (150) in one embodiment. Gateway system 150 is shown containing external network interface 310, gateway operations 320, policy engine 350 and internal network interface 340. Each block of FIG. 3A is described below in further detail.

External network interface 310 facilitates interaction of gateway system 150 with Internet 120. Specifically, external network interface 310 receives packets (via path 121) initiated from end-user systems 110 requesting access to resources hosted in computing infrastructure 130. In an embodiment, external network interface 310 is implemented as a network interface card (NIC). During operation, external network interface 310 receives a packet requesting access to a resource from end-user system 110 via path 121 and then sends the packet to gateway operations 320.

Internal network interface 340 facilitates interaction of gateway system 150 with digital systems in computing infrastructure 130. Specifically, internal network interface 340 forwards packets to the determined one of digital systems 160/181/182 over Intranet 140. In an embodiment, internal network interface 340 is implemented as a NIC. During operation, internal network interface 340 receives a packet from policy engine 350 via path 345 and then forwards the packet to one of the digital systems hosted in computing infrastructure 130 via path 151.

Gateway operations 320 performs typical gateways operations such as authentication, destination lookup (to determine next system to forward to), etc., as is well known in the relevant arts. After performing such operations, gateway operations 320 sends the packet to policy engine 350 to perform the task of applying policies.

In one embodiment, gateway system 150 operates as a reverse proxy. As is well known in the relevant arts, a reverse proxy operates to receive requests from end-user systems 110 and distributes each of the requests among various servers (digital systems in computing infrastructure 130) deployed for processing the request. The reverse proxy may also receive the corresponding responses and forward the same to the end-user systems 110 from which the respective requests are received. Gateway operations 320 may accordingly include specific operations of a reverse proxy such as load balancing, caching, etc. as is well known in the relevant arts.

Policy engine 350 receives packets from gateway operations 320 (via path 325) and identifies and applies access control policies applicable to the requested resource in each packet. As noted above, the applicable policies may be identified by checking if the target resource specified in the packet matches with the resource specified as part of the policy.

In an embodiment described in detail below, a policy data specifying the various policies to be applied by policy engine 350 may be maintained, each policy specifying a corresponding resource, conditions to be validated and a corresponding action (permit or deny). The policy data may be maintained either internally, for example, in a hard disk within gateway system 150 or externally in an external data store not shown in the Figure. Policy engine 350 accordingly identifies the applicable policies by inspecting the policy data to determine the policies whose corresponding resource matches (based on the URL) the resource specified in the packet.

During operation, policy engine 350 receives a packet from gateway operations 320 (via path 325), and identifies and applies higher-layer policies applicable to the requested resource. The determination of higher-layer policies may be performed based on the attributes specified in the policy or based on policy data indicating the specific layer to which each policy is applicable.

If access to the resource is not denied (and assuming additional policies at lower layers are present for applying), policy engine 350 redirects the request in the packet to policy engine 350 via path 355, for further applying additional policies. Redirection generally entails forwarding the payload with any appropriate header encapsulation to cause policy engine 350 to apply additional policies. Path 355 represents the path of redirection of packets from policy engine 350 to itself. Policy engine 350 receives the redirected packet and identifies and applies lower-layer policies. If access to the resource is not denied, policy engine 350 sends the packet (via path 345) to internal network interface 340. Internal network interface 340 forwards packets to the determined one of digital systems 160/181/182 via path 151.

Thus, gateway system 150 operates to control access to resources hosted in computing infrastructure 130. It may be appreciated that in the above description it is assumed that gateway system is implemented as a single device. However, in alternative embodiments, gateway system 150 may be realized using one or more devices/systems. Some of such alternative implementations of gateway system 150 according to several aspects of the present disclosure are described below with examples.

5. Alternative Implementations

FIG. 3B is a block diagram illustrating an alternative implementation of a gateway system (150) using a policy device and a network device. The block diagram is shown containing network device 360 and policy device 370. Policy device 370 in turn is shown implementing policy engine 350.

Network device 360 intercepts requests originating from end-user systems 110 directed to computing infrastructure 130 via path 121 and performs typical gateway operations (similar to the operations of block 320 of FIG. 3A). In an embodiment, network device 360 may be a reverse proxy. Policy device 370 operates to provide access control to the requested resource.

During operation, network device 360 receives a packet from end-user system 110 via path 121, performs gateway operations and sends the packet to policy device 350 via path 325. Policy engine 350 implemented in policy device 370 identifies and applies higher-layer policies. If access to the resource is permitted (not denied), policy engine 350 sends the packet to network device 360 via path 355 after adding appropriate header information such as IP address to indicate that the packet is to be redirected to policy device 370. Network device 360 receives the packet via path 355 and sends it back to policy device 370 (based on the header information) for applying additional policies. Policy engine 350 implemented in policy device 370 identifies and applies lower-layer policies. If access to the resource is permitted, policy device 370 forwards the packet to one of digital systems in computing infrastructure 130 via path 345/151.

It may be appreciated that the implementation of FIG. 3B may be used when an existing network device (360) is operational in computing infrastructure 130 and policy device (370) is required to be plugged in to such infrastructure. The description is continued below to illustrate another alternative implementation of gateway system using a cluster of policy devices and a network device.

FIG. 3C is a block diagram illustrating an alternative implementation of gateway system using a cluster of policy devices and a network device. The block diagram is shown containing network device 360 and cluster 390. Cluster 390 in turn in shown containing policy device 370-A implementing policy engine 350-A and policy device 370-B implementing policy engine 350-B.

As is well known in the relevant arts, a cluster contains one or more devices (such as policy device 370-A and policy device 370-B) that work together to increase performance and/or reliability. Clustering distributes/assigns workloads (access requests) to each device, manages the transfer of workloads between devices, and provides access to all resources from any device regardless of the physical location of the resource. Devices in a cluster have the same IP address, as is also well known in the relevant arts. Thus, policy device 370-A and policy device 370-B have the same IP address. Policy engines 350-A and 350-B are instances of policy engine 350 and accordingly perform the same operations note above for policy engine 350.

During operation, network device 360 receives a packet from end-user system 110 via path 121, performs gateway operations and sends the packet to cluster 390, which in turn is shown assigning policy device 370-A for processing the packet (path 325). Policy engine 350-A of policy device 370-A identifies and applies higher-layer policies. If access to the resource is permitted (not denied), policy device 370-A sends the packet to network device 360 via path 355 (after including appropriate header information such as IP address of cluster 390). Network device 360 receives the packet and sends the packet back to cluster 390 (based on the header information), which in turn is shown assigning policy device 370-B for processing the packet (path 355). It may be appreciated that cluster 390 may assign the packet to any one of policy devices (370-A or 370-B) within cluster 370 for subsequent application of policies.

Policy device 370-B receives the packets from network device 360, and may determine that the higher-layer policies have already been applied on the packet (for example, based on header information). Policy engine 350-B of policy device 370-B accordingly identifies and applies lower-layer policies. If access to the resource is permitted (not denied), policy device 370-B forwards the packet to one of digital systems in computing infrastructure 130 via path 345/151.

Though cluster 390 is shown as containing two policy devices, it will be apparent to a skilled practitioner that cluster 390 may contain a greater number of policy devices depending on the performance/reliability requirements of computing infrastructure 130.

It may be appreciated that the implementation of FIG. 3C may be advantageous when an existing network device is operational in computing infrastructure 130 and the number of incoming requests is high (of the order of 10,000 requests/minute). The cluster of policy devices operates to efficiently apply access control to resources in such a scenario.

Thus, gateway system 150 operates to control access to resources hosted in computing infrastructure 130 based on the policy engine (350/350-A/350-B). The manner in which such a policy engine is implemented is described below with examples.

6. Policy Engine

Figure 4:
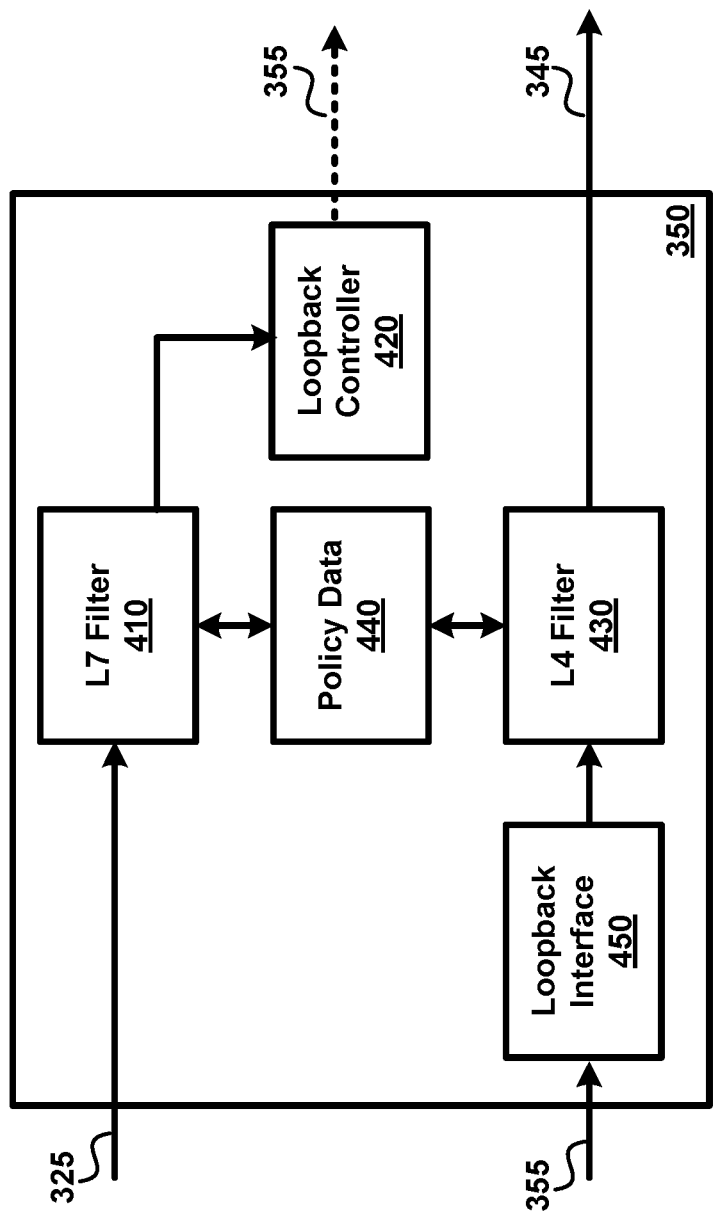
FIG. 4 is a block diagram illustrating the manner in which a policy engine is implemented in one embodiment.

FIG. 4 is a block diagram illustrating the manner in which a policy engine (350/350-A/350-B) is implemented in one embodiment. For illustration, it is assumed that the higher-layer is application layer (referred to as L7) of the OSI model and lower-layer is transport layer (referred to as L4) of the OSI model. Accordingly, policy engine 350 is shown containing L7 filter 410, loopback controller 420, policy data 440, L4 filter 430 and loopback interface 450. It may be appreciated that policy engine 350 may include other filters (e.g., L2, L3, etc.) corresponding to other layers (of the OSI model), as will be apparent to one skilled in the art by reading the disclosure herein. Each block of FIG. 4 is described below in further detail.

Policy data 440 stores the policies specified for controlling access to resources in computing infrastructure 130. Each policy in policy data 440 is associated with a corresponding layer in the networking model, as will be described in further detail with respect to FIG. 5. Thus, in this illustrative embodiment, policy data 440 includes application-layer (L7) policies and transport-layer (L4) policies, though the embodiment is operable with policies at other layers (e.g., based on IP addresses of networking layer).

L7 filter 410 receives packets via path 325, inspects policy data 440 to identify L7/application-layer policies applicable to the requested resource and applies the identified L7 policies. If access to the resource is permitted based on applying all the identified application-layer policies and if there are additional policies (at other layers) to be application, L7 filter 410 sends the packet to loopback controller 420. If no additional policies (at other layers) need to be applied, L7 filter 410 may forward the packet (not shown) to computing infrastructure 130.

Loopback controller 420 operates to redirect the packet via path 355. Loopback controller 420 thus sets the destination IP address/destination port of the packet based on the specific implementation of gateway system 150. Loopback interface 450 operates to receive the redirected packets via path 355 and forward the received packets to L4 filter 430. Loopback interface 450 may receive packets according to the same protocol (e.g., HTTP/TCP) as loopback controller 420.

L4 filter 430 receives packets from loopback interface 450, identifies (from policy data 440) L4/transport-layer policies applicable to the requested resource and then applies the identified policies on the packets. If access to the resource is permitted based on applying all the identified transport-layer policies, then L4 filter 430 forwards the packet to computing infrastructure 130 via path 345.

It may be appreciated that if applying of any one of the policies among the identified policies by L7 filter 410/L4 filter 430 results in denial of access to the resource, then the access to the resource is denied. Access may be denied, for example by dropping the packet and/or responding back with an appropriate error message (indicating denial of access). In either case of dropping or forwarding, additional operations such as reporting packet details to administrator, logging packet, etc., may be performed by the corresponding filter.

In one embodiment, each of L7 filter 410 and L4 filter 430 is implemented as a corresponding listener. As is well known in the relevant arts, a listener is an executable module which, when loaded in memory (as a process), operates to wait for events to occur on pre-specified port(s), and performs pre-defined operations/executes instructions upon occurrence of the respective events. Typically, a listener is loaded into memory at the time of booting the device (e.g., gateway system 150).

In addition, loopback controller 420 is implemented as Unix Domain Socket (UDS). As is well known in the relevant arts, UDS is a data communication endpoint that enables inter-process communication between processes executing on the same host operating system. As such, loopback controller 420 formats the header of the packet according to UDP protocol and correspondingly encapsulates the payload of the packet, and redirects the packet according to UDP protocol. In such an embodiment, L7 filter 410 listens on port 80 and receives packets via path 325 according to HTTP protocol while L4 filter 430 listens on a loopback port (other than port 80) and receives packets via path 355 according to UDP protocol.

It may be appreciated that the implementation of L7 and L4 filters as corresponding listeners/processes and the usage of UDS facilitating inter-process communication enables the multiple components of policy engine (350) to be implemented as an in-memory executable module. Such an in-memory policy engine operating in gateway system 150 (implementation of FIG. 3A) reduces the latency (delay in processing) of the packets. Latency may be further reduced by usage of in-memory redirection, as operations like encryption and decryption of the packets are avoided. Such an approach also avoids the usage of a chain of proxies for applying policies at corresponding layers of networking model. This is particularly beneficial in improving performance in zero trust environments that would otherwise necessitate re-authentication and re-authorization at each proxy.

It may be further appreciated that the identification and applying of policies by L7 filter 410 may be viewed as a first iteration of policy engine 350 and the identification and applying of policies by L4 filter 430 may be viewed as a second iteration of policy engine 350. Accordingly, in the implementation of FIG. 3A, both the first and second iterations are performed by gateway system 150. In the implementation of FIG. 3B, both the first and second iterations are performed by policy device 370, while in the implementation of FIG. 3C, the first iteration is performed by policy device 370-A and the second iteration is performed by policy device 370-B.

Though policy engine 350 is described as performing two iterations of identifying and applying policies, a greater number of such iterations may be implemented at corresponding layers, as will be apparent to a skilled practitioner without departing from the scope and spirit of several aspects of the present invention, by reading the present disclosure. In alternative embodiments, policy engine 350 may first identify all applicable policies at different layers and then apply higher-layer policies followed by lower-layer policies.

Thus, policy engine 350 operates to control access to resources hosted in computing infrastructure 130 based on the policy data (440), shown implemented as part of the policy engine. The manner in which policy data may be maintained is described below examples.

7. Policy Data

FIG. 5 depicts portions of policy data containing policies used by policy engine 350 for controlling access to resources in one embodiment. The policies may be specified by administrators of the enterprise system using an appropriate user interface. Though shown in the form of a table, configuration data may be maintained according to other data formats (such as XML), and/or using other data structures (such as lists/trees, etc.,) as will be apparent to a skilled practitioner by reading the disclosure provided herein.

Table 500 depicts a portion of policy data used by policy engine 350 for controlling access to resources hosted in computing infrastructure 130. Specifically, column 511 specifies a unique identifier associated with a policy, while column 512 specifies a unique identifier associated with a resource. In an embodiment, a resource hosted in computing infrastructure 130 is uniquely identified using URL, although other naming techniques may be used to identify a resource, as will be apparent to a skilled practitioner by reading the disclosure herein. Column 513 specifies a condition associated with the policy. Column 514 specifies the action to be taken upon applying the policy. In one embodiment, the action corresponds to one of Allow or Deny.

For a specific policy, when the condition is met, the corresponding action is executed. In general, a condition may be viewed as having a (unique) identifier/type and a value. A condition is considered to be met when attributes identified with the same identifier/type in the packet have a value covered by those of the corresponding policy.

Column 515 specifies the layer of the networking model at which the policy is applicable. Only some of the fields of the policy table, as relevant to an understanding of the disclosure, are depicted in the Figure for conciseness. The policy table may contain other fields for each policy (such as a priority number, etc.) and many more rows, as will be apparent to persons skilled in the art.

Each of rows 551-554 of table 500 specifies the details of a corresponding policy. For example, row 551 specifies a policy having the identifier "P101", which allows all users (condition User: Any) to access resource '/homepage' hosted in computing infrastructure 130. Similarly, row 552 specifies a policy "P102", which allows only users belonging to group 'Administrator' to access '/admin' resource. Other rows specify the details of other policies controlling access to resources hosted in cloud infrastructure 130. A value of '/' in column 512 of table 500 is understood to indicate any resource. Rows 551-552 specify application-layer policies (see column 415), while rows 553-554 specify transport-layer policies.

During operation, policy engine 350 receives a packet requesting access to a resource (e.g., /admin) via path 325. L7 filter 410 identifies L7 policies (here P102) applicable to the resource from policy data 440. L7 filter 410 applies policy P102 and determines that access to the resource is not denied (as the user is determined to belong to user group 'Administrator'). L7 filter 410 sends the packet to loopback controller 420. Loopback controller 420 redirects the packet via path 355.

Loopback interface 450 receives the redirected packet and sends the redirected packet to L4 filter 430. L4 filter 430 identifies L4 policies (here P103, P104) applicable to the resource from policy data 440. L4 filter 430 applies policies P103 and P104, and determines that access to the resource is not denied (as the destination IP address/port and source IP address/port are between the respective ranges specified in policies P103, P104). L4 filter 430 forwards the packet to the target digital system in computing infrastructure 130 via path 345.

On the other hand, if applying policy P104 results in denying access to the requested resource (because the IP address of end-user system 110-3 is [1.45.0.3]), L4 filter 430 denies access to the resource, and the packet is not forwarded via path 345.

In this manner, policy engine 350 operates to control access to resources in computing infrastructure 130 based on policies at different layers. It may be desirable that policy engine 350 have additional capabilities such as application service chaining, load balancing, honeypot support, etc. normally provided by a gateway system (150). The manner in which policy engine (350) and policy data 440 shown in FIGS. 4 and 5 respectively may be suitably modified to provide such additional capabilities is described below with examples.

8. Application Service Chaining

Application service chaining refers to execution of a set of application services in a pre-defined order/sequence upon receipt of packets at a gateway system, with each application service specifying the next application service in the chain. Each application service is a software module that is typically executed within gateway system 150.

Application services that may be part of such chaining include, but not limited to, Intrusion Detection Service (IDS) that examines network traffic and analyzes it to identify threats or malicious user activity, IPS (Intrusion Prevention Service), DLP (Data Loss Prevention), WAN (Wireless Area Network) bandwidth optimization, firewall, web filtering, NAT (Network Address Translation), etc.

One of the technical challenges in application service chaining is to make available a context containing information from the original request (packet received via path 325), to application services down the line (executed later in the chain). Such context facilitates applications services (specifically those down the line) to work with information contained in the original request. Typically, the context is maintained in memory (e.g., as part of session) and thereafter is made available to application services down the line. As gateway systems typically have limited memory, such a memory-based approach may limit the number of application services that can be chained and/or the size of the packets that can be processed. The manner in which such drawbacks may be overcome using policy engine 350 in gateway system 150 is described in detail below.

Figure 6A:
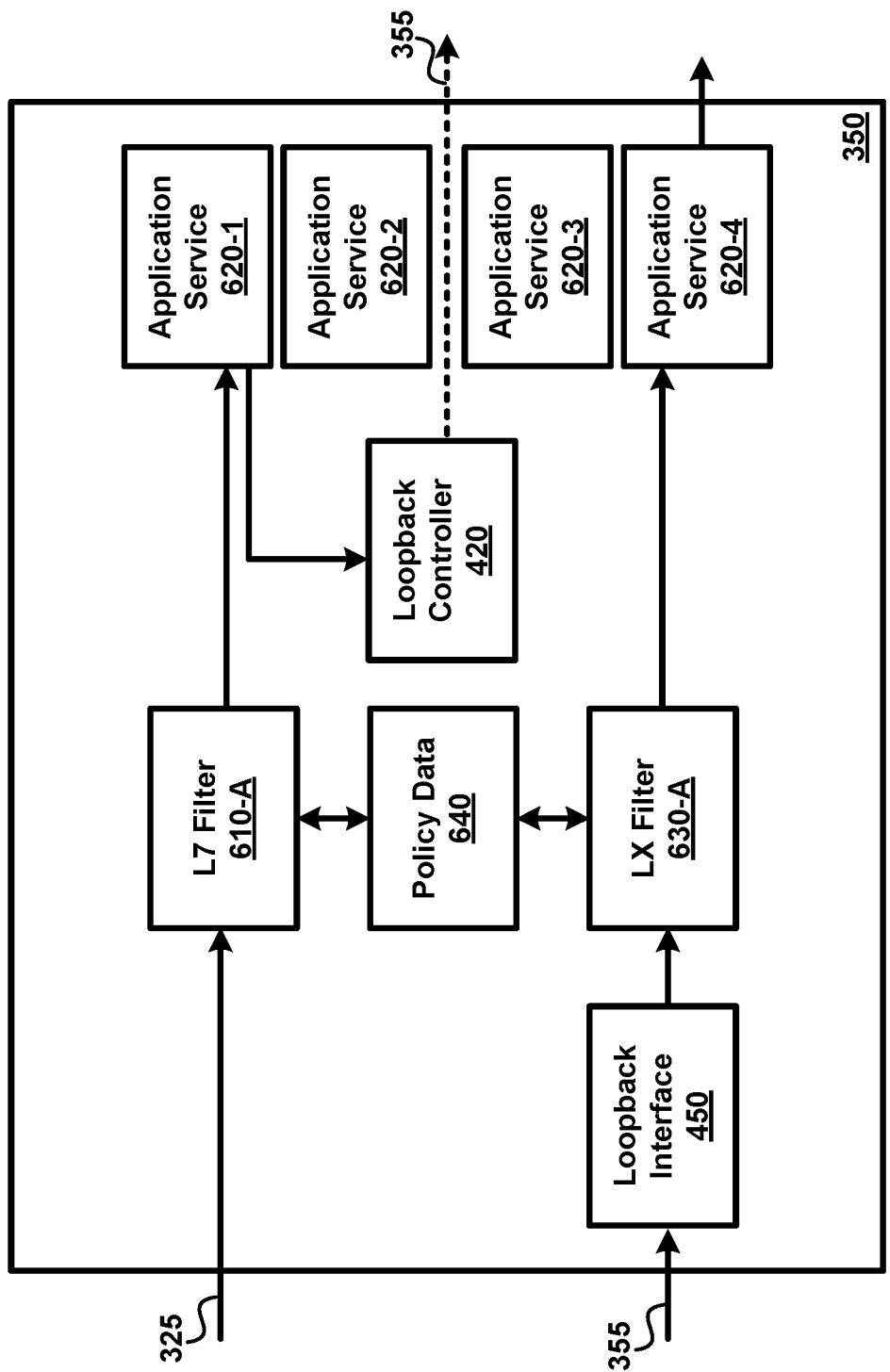
FIG. 6A illustrates the manner in which application service chaining is provided using the policy engine in one embodiment.

FIG. 6A illustrates the manner in which application service chaining is provided using a policy engine (350) in one embodiment. In particular, policy engine 350 is shown containing loopback controller 420, loopback interface 450, L7 filter 610-A, LX filter 630-A, policy data 640 and application services 620-1 to 620-4. Each of the blocks is described in detail below.

Blocks 420 and 450 respectively correspond to in addition to blocks 420 and 450 shown in FIG. 4, and accordingly their description is not repeated here in the interest of conciseness.

Each of application service 620-1 to 620-4 represents a respective application service running on a respective port of the device (here gateway system 150) implementing policy engine 350. Each application service is capable of forwarding the packet to the determined digital system in computing infrastructure 130 after successful execution of the application service. Although only four application services are depicted in FIG. 6A, many more application services may be implemented in gateway system 150, as will be apparent to persons skilled in the art. For illustration, it is assumed that application service 620-1 is IPS (Intrusion Prevention Service) and application service 620-4 is DLP (Data Loss Prevention).

Policy data 640 is similar to policy data 440 (of FIG. 4) with additional data to indicate the application service(s) to be invoked after applying a corresponding policy. The additional data may be specified as part of one of the columns (e.g., 514/Action) of table 500. Alternatively, a separate column in addition to columns 511-515 may be provided for specifying (an identifier of) the application service. L7 filter 610-A operates in a manner similar to L7 filter 410 (of FIG. 4) and in addition invokes application services based on policy data 640.

LX filter 630-A (X representing a number between 1 and 7) inspects policy data 640 to identify policies corresponding to LX-layer applicable to the requested resource and applies the identified LX policies. In addition, LX filter 630-A inspects the packets for presence of specific meta-tags in the packet header. Upon determining that a specific meta-tag is present, LX filter 630-A invokes a corresponding one of application services 620-1 to 620-4. The determination of the application service to invoke for a specific meta-tag may be pre-configured or may be based on a configuration data (not shown) maintained in policy engine 350. It should be noted that when X is 7 (that is LX filter is an L7 filter), it is assumed that L7 filter 610-A identifies and applies all the L7 policies, with LX filter 630-A not applying any policies but only checking for meta-tags in the packet in order to determine the next application service to be invoked.

During operation, L7 filter 610-A, after identifying and applying application-layer policies, determines a first application service that needs to be invoked. As noted above, L7 filter 610-A may perform the determination based on policy data 640. In one embodiment, application-layer policies may be ordered based on a priority, and the last policy in the set of applicable policies may specify the application service that needs to be invoked. L7 filter 610-A invokes the first application service in the chain. The first application service, upon successful execution, determines the next application service to be invoked. Accordingly, the first application service adds a meta-tag in the packet header corresponding to the next application service, and redirects the packet to loopback controller 420.

Loopback interface 450 receives the redirected packet and sends the packet to LX filter 630-A. LX filter 630-A, after identifying and applying LX-layer policies applicable to the requested resource, inspects the packet for presence of specific meta-tags in the packet header. If a specific meta-tag is present in the packet header, LX filter 630-A invokes the corresponding application service. Upon successful completion of execution, the application service forwards the packet to computing infrastructure 130.

The manner in which application service chaining is provided by policy engine is described below with an illustrative example.

9. Illustrative Example for Application Service Chaining

Upon receiving a packet containing an access request for a particular resource, L7 filter 610-A determines that application service 620-1/IPS needs to be invoked (for example, based on policies specified for the particular resource). IPS then checks whether the access request is directed to an update. Upon determining that the received packet is an update access packet, IPS checks whether the end-user system (e.g., 110-6) from which packet is received is a BYOD (Bring-Your-Own-Device) system. As is well known, BYOD system is a non-enterprise device such as a user's personal laptop/tablet. If the end-user system is determined to be not a BYOD system, IPS forwards the packet to loopback controller 420 without adding any meta-tags.

If IPS determines that the received packet is directed to an update access request and that the end-user system is a BYOD system, IPS adds a meta-tag (e.g., 'X-request-dlp') in the packet header indicating that application service 620-4/DLP needs to be invoked next in the application service chain for further analysis of the packet. IPS, upon successful completion of execution, sends the packet to loopback controller 420. Loopback controller 420 redirects the packet via path 355. Loopback interface 450 receives the redirected packet, and sends the packet to LX filter 630-A. It may be noted that the redirected packet sent to LX filter 630-A contains one or meta-tags included by application service 620-1/IPS.

LX filter 630-A inspects the packet for presence of specific meta-tags in the packet header. Upon receiving the redirected packet noted above, LX filter 630-A identifies the meta-tag "'X-request-dlp' added by IPS, determines that the application service corresponding to the meta-tag is DLP and accordingly invokes application service 620-4/DLP. DLP examines the packet and determines that the geographical location of end-user system 110-6 is not a permitted location. Therefore, DLP restricts access rights for the resource to 'read only', and sends the packet to one of digital systems in computing infrastructure 130.

It may be appreciated that when end-user system 110-6 is a secure system (not BYOD), then application service 620-1/IPS does not add any meta-tag in the packet header. Accordingly, application service 620-4/DLP is not invoked, and the packet is forwarded to computing infrastructure 130 by LX filter 630-A.

Thus, application service chaining is provided by policy engine 350. Although the illustrative embodiment depicts chaining two application services, it may be appreciated that any number of application services may be chained dynamically. Specifically, each application service in the chain may send the packet to loopback controller 420 after completion of execution. Policy engine 350 may receive the redirected packet and invoke the next application service in the chain by inspecting the meta-tags in the packet header.

It may be appreciated that since the original packet (received via path 325) is merely forwarded (by L7 filter 610-A) and redirected (by loopback controller 420) back to policy engine 350, and LX filter 630-A may receive all the information that was part of the original request. Accordingly, the original information is made available to the application service down the line (here, application service 620-4) without having to use any in-memory approaches (e.g., context noted above). Such an approach may result in high performance and low latency when multiple application services are chained.

The description is continued to illustrate the manner in which load balancing is provided according to several aspects of the present disclosure.

10. Load Balancing

Load balancing refers to efficiently distributing incoming network traffic across a group of servers. Typically, in an enterprise scenario, load balancing is often provided at different layers of a networking model in order to have minimal response time for requests. For example, a group of servers may be load-balanced at application-layer (L7) while another group of servers may be load-balanced at transport-layer (L4). In prior approach, a chain of gateway devices is employed to distribute the incoming requests to load balancers operating at different layers. The manner in which load balancing is provided using a policy engine (350) in one embodiment is described in detail below with reference to FIG. 6B.

Figure 6B:
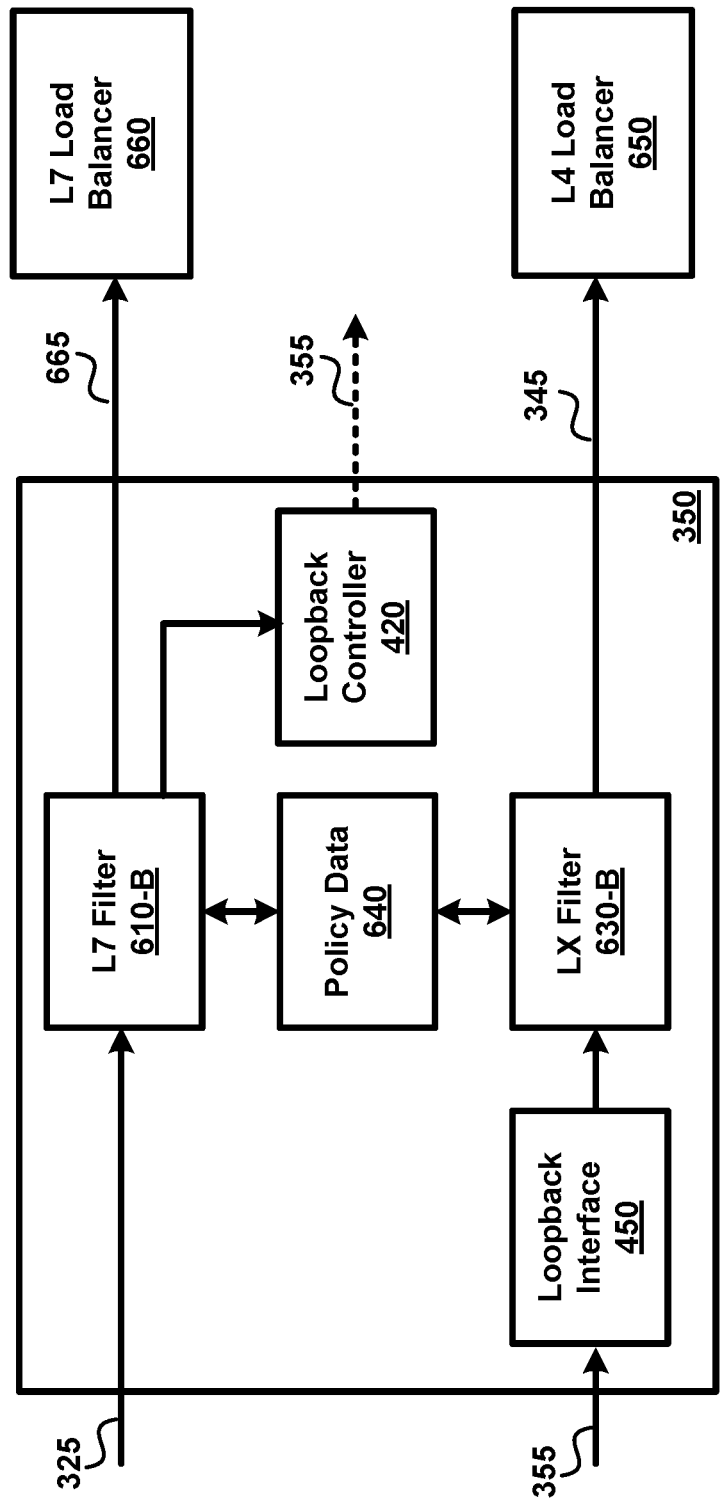
FIG. 6B illustrates the manner in which load balancing is provided using the policy engine in one embodiment.

FIG. 6B is shown containing policy engine 350, L7 load balancer 660 and L4 load balancer 650. Policy engine 350 in turn is shown containing L7 filter 610-B, policy data 640, loopback controller 420, loopback interface 450 and LX filter 630-B. Blocks 420, 450 and 640 respectively correspond to blocks 420, 450 and 440 depicted in FIG. 4 and accordingly their description is not repeated here in the interest of conciseness.

L7 load balancer 660 represents a load balancer that is designed to perform application-layer load balancing by distributing incoming packets across a group of digital systems, based on attributes in the application-layer. L4 load balancer 650 represents a load balancer that is designed to perform transport-layer load balancing by distributing incoming packets across a group of digital systems, based on attributes in the transport-layer. Each of L7 load balancer 660 and L4 load balancer 650 may employ techniques like round-robin, weighted round-robin, least connection, etc. for performing load balancing, as is well known in the relevant arts.

LX filter 630-B operates in a manner similar to L4 filter 430 (of FIG. 4) but identifies policies corresponding to LX-layer applicable to the requested resource and applies the identified LX policies. LX filter 630-B forwards, on path 345, packets that have been permitted based on L7 and LX policies. L7 filter 610-B operates in a manner similar to L7 filter 410 (of FIG. 4) and in addition provides, on path 665, packets that have been permitted access based on L7 policies.

It may be appreciated that L7 load balancer 660 may be connected on path 665, thereby providing application-layer load balancing and L4 load balancer 650 may be connected on path 345, thereby providing transport-layer load balancing. Thus, load balancing is provided by policy engine 350 at multiple layers without the need for chaining multiple gateway devices, thus reducing latency.

The description is continued to illustrate the manner in which policy engine 350 provides support for honeypot according to several aspects of the present disclosure.

11. Supporting Honeypot

A honeypot refers to an intentionally insecure and vulnerable system, designed to attract malicious users to study their behavior. When access to a resource is denied based on applying policies at different layers, an appropriate error message may be returned to the user indicating denial of access. However, it may be desirable that packets which are denied access are not reported to the end-user but rather redirected to honeypot for further analysis. The manner in which policy engine 350 supports for redirection to honeypot in one embodiment is described in detail below with reference to FIG. 6C.

Figure 6C:
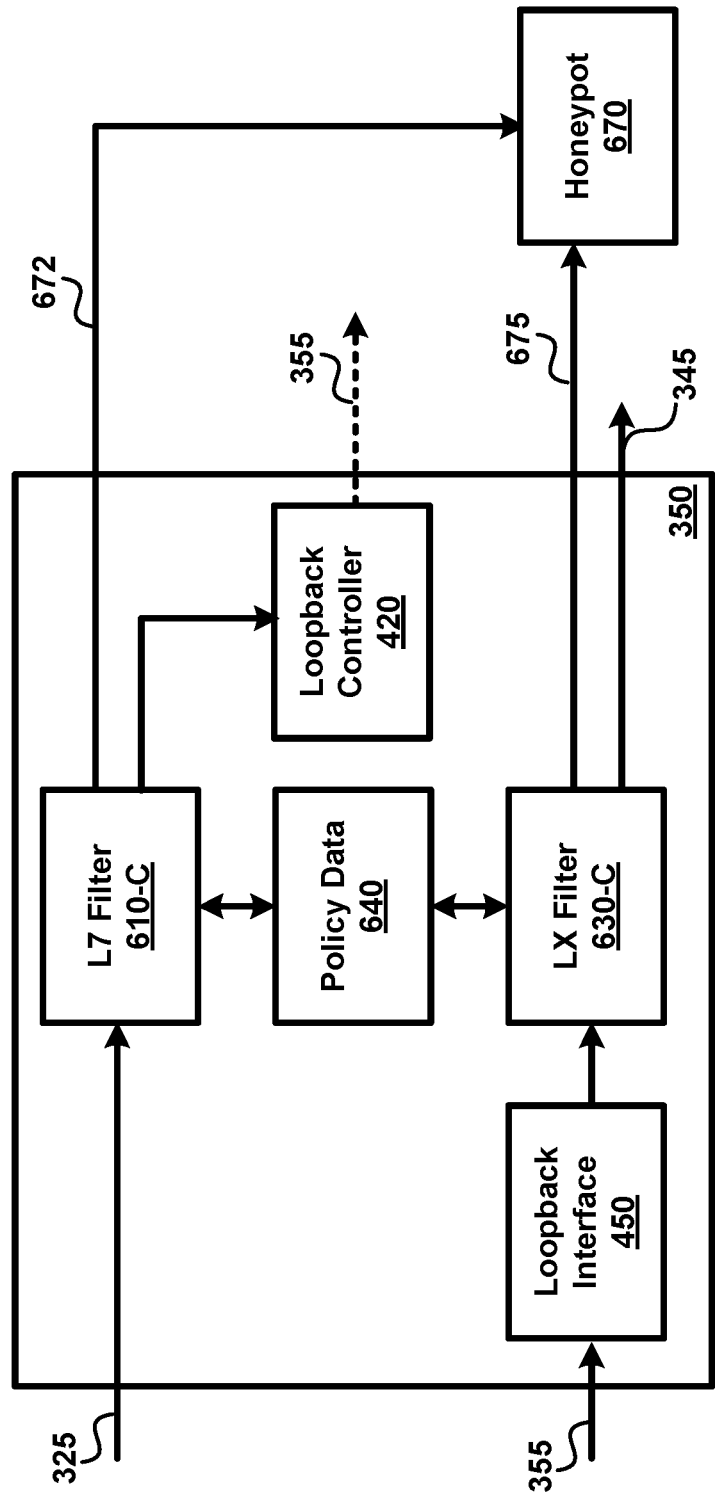
FIG. 6C illustrates the manner in which honeypot support is provided using the policy engine in one embodiment.

FIG. 6C is shown containing policy engine 350 and honeypot 670. Policy engine 350 in turn is shown containing L7 filter 610-C, policy data 640, loopback controller 420, loopback interface 450 and LX filter 630-C. Blocks 420, 450 and 640 respectively correspond to blocks 420, 450 and 440 depicted in FIG. 4 and accordingly, the description is not repeated here in the interest of conciseness.

L7 filter 610-C operates in a manner similar to L7 filter 410 (of FIG. 4) with the additional capability of forwarding packets that are denied access to the requested resource based on L7 policies on path 672. LX filter 630-C operates in a manner similar to L4 filter 430 (of FIG. 4) but identifies policies corresponding to LX-layer applicable to the requested resource and applies the identified LX policies. LX filter 630-C forwards on path 675, packets are denied access to the requested resource based on LX policies.

Honeypot 670 represents a server such as a web/application server that is configured to operate as an insecure and vulnerable system. Honeypot 670 may be connected on paths 672 and 675, thereby facilitating support for honeypot. Thus, policy engine 350 provides support for honeypot in computing infrastructure 130.

It should be appreciated that the features described above can be implemented in various embodiments as a desired combination of one or more of hardware, software, and firmware. The description is continued with respect to an embodiment in which various features are operative when the software instructions described above are executed.

12. Digital Processing System

Figure 7:
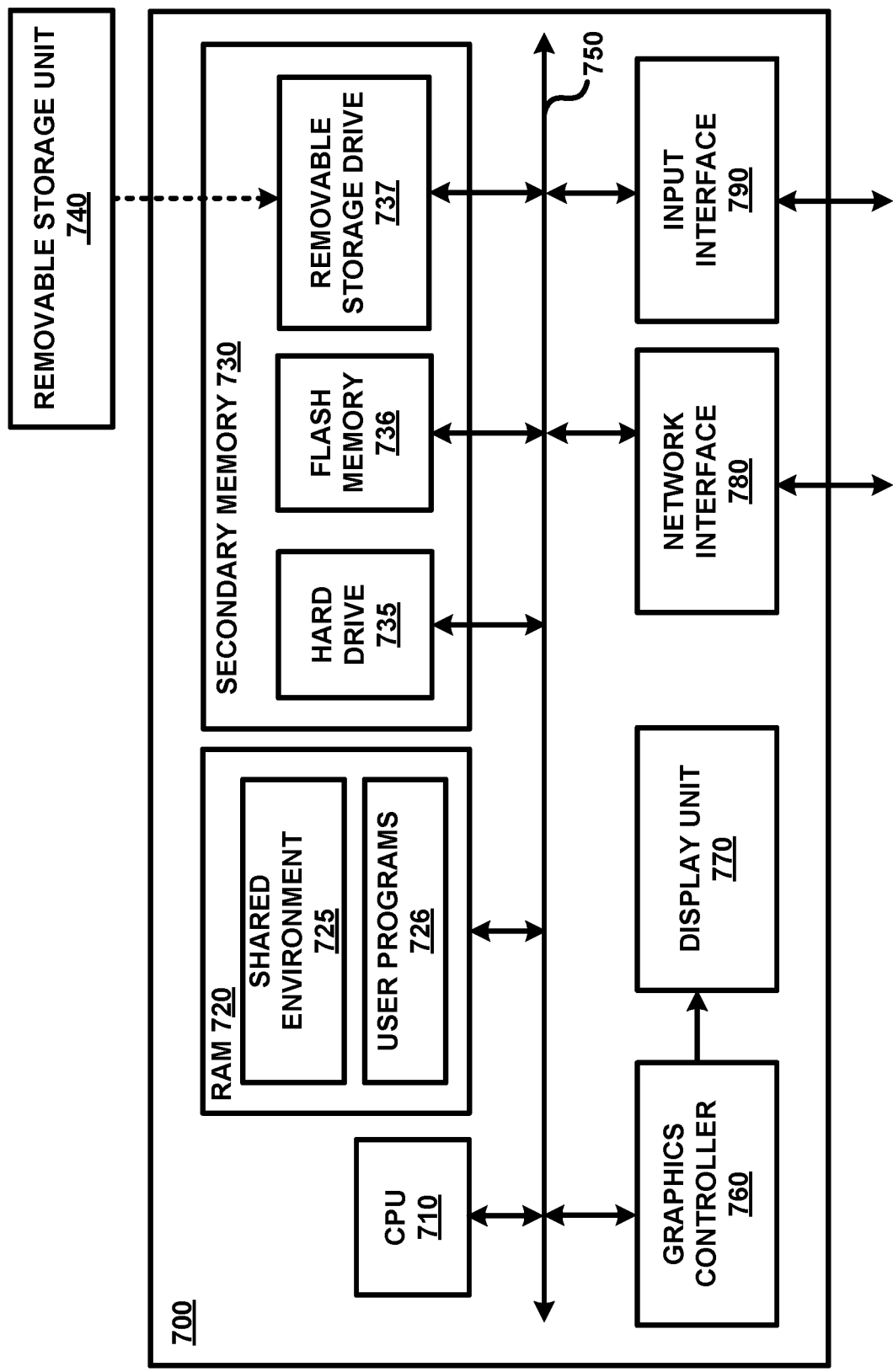
FIG. 7 is a block diagram illustrating the details of digital processing system in which various aspects of the present disclosure are operative by execution of appropriate executable modules.

FIG. 7 is a block diagram illustrating the details of digital processing system 700 in which various aspects of the present disclosure are operative by execution of appropriate executable modules. Digital processing system 700 may correspond to gateway system 150.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well-known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit. In addition, CPU 710 may be supported by CAM (content addressable memory) structures for examination of complex patterns.

RAM 720 may receive instructions from secondary memory 730 using communication path 750. RAM 720 is shown currently containing software instructions constituting shared environment 725 and/or other user programs 726 (such as the blocks of gateway system 150 or digital system shown in FIG. 1). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems (of FIG. 1) connected to the networks (110).

Secondary memory 730 may contain hard drive 735, flash memory 736, and removable storage drive 737. Secondary memory 730 may store the data (for example, internal file system 310 in case of digital system 160 and clean files 330 in case of file system 320) and software instructions (for example, for implementing the various features of the present disclosure as shown in FIG. 2, etc.), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

13. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of controlling access to resources in networks, the method being performed in a gateway system, the method comprising:

maintaining a policy data specifying a respective plurality of policies for corresponding resources, wherein each policy of said plurality of policies specifies a condition and whether to allow or deny access to the corresponding resource upon satisfying of said condition;

receiving by said gateway system from an end user system, a packet requesting access to a first resource hosted on a digital system connected to said gateway system via a network;

identifying from said policy data, a first plurality of policies based on a form of text contained in said packet, said text being comprised in a URL (Universal Resource Locator) or a URI (Uniform Resource Identifier) uniquely identifying said first resource in said packet;

applying, by said gateway system, on said packet a first policy and then a second policy to determine whether or not to forward said packet to said network, wherein said first policy and said second policy are comprised in said first plurality of policies, wherein said first policy and said second policy are respectively at a higher-layer and a lower-layer of a stack of layers defined according to a networking model, wherein said networking model is according to one of OSI (Open Systems Interconnection) and TCP/IP (Transmission Control Protocol/Internet Protocol); and forwarding, by said gateway system, said packet to said digital system on said network only if applying said first policy on said packet determines to forward said packet on said network, followed by applying said second policy on said packet determines to forward said packet on said network.

2. The method of claim 1, wherein said higher layer is an application layer and said lower layer is one of a presentation layer, a session layer, a transport layer, a network layer, a data link layer and a physical layer according to said networking model, wherein said network is a zero trust network.

3. The method of claim 1, further comprising:

in response to receiving said packet, performing a first iteration of said identifying and said applying to identify and apply a first set of higher-layer policies including said first policy;

redirecting said packet to said gateway system if it is determined to permit access to said first resource based on applying said first set of higher-layer policies;

in response to receiving said redirected packet, performing a second iteration of said identifying and said applying to identify and apply a second set of lower-layer policies including said second policy; and performing said forwarding if it is determined to permit access to said first resource based on applying said second set of lower-layer policies.

4. The method of claim 3, wherein said packet is received according to a first network protocol at a first port of said gateway system, wherein said redirecting redirects said packet according to a second network protocol, wherein said redirected packet is received at a second port of said gateway system.

5. The method of claim 4, wherein said gateway system is a reverse proxy, wherein a first listener process listens on said first port according to said first network protocol, performs said first iteration and performs said redirecting, wherein a second listener process listens on said second port according to said second network protocol, performs said second iteration and performs said forwarding, wherein said second network protocol facilitates inter-process communication, wherein said redirecting is achieved in-memory using said first listener process, said second listener process and said second network protocol.

6. The method of claim 3, wherein said gateway system comprises a policy device and a network device, wherein said packet is received at said network device, wherein said packet is sent to said policy device by said network device, wherein said policy device performs said first iteration in response to receiving said packet, wherein said redirecting redirects said packet to said network device, wherein said network device sends said redirected packet to said policy device, wherein said policy device performs said second iteration in response to receiving said redirected packet, wherein said policy device forwards said packet to said network if it is determined to permit access to said first resource.

7. The method of claim 3, further comprising:

invoking a first application service after performing said first iteration, wherein said redirecting is performed upon completion of execution of said first application service; and invoking a second application service after performing said second iteration, wherein said forwarding is performed upon completion of execution of said second application service.

8. The method of claim 3, further comprising:

after performing said first iteration, said forwarding forwards said packet to a higher-layer load balancer, wherein after performing said second iteration, said forwarding forwards said packet a lower-layer load balancer, whereby load balancing is achieved at both higher-layer and lower-layer.

9. The method of claim 3, further comprising in response to said first iteration or said second iteration, sending said packet to a honeypot if it is determined that the packet is not to be forwarded to said network.

10. A gateway system, comprising:

one or more memories for storing instructions; and one or more processing units, wherein execution of the instructions by the one or more processing units causes the gateway system to perform the actions of:

maintaining a policy data specifying a respective plurality of policies for corresponding resources, wherein each policy of said plurality of policies specifies a condition and whether to allow or deny access to the corresponding resource upon satisfying of said condition;

receiving by said gateway system from an end user system, a packet requesting access to a first resource hosted on a digital system connected to said gateway system via a network;

identifying from said policy data, a first plurality of policies based on a form of text contained in said packet, said text being comprised in a URL (Universal Resource Locator) or a URI (Uniform Resource Identifier) uniquely identifying said first resource in said packet;

applying, by said gateway system, on said packet a first policy and then a second policy to determine whether or not to forward said packet to said network, wherein said first policy and said second policy are comprised in said first plurality of policies, wherein said first policy and said second policy are respectively at a higher-layer and a lower-layer of a stack of layers defined according to a networking model, wherein said networking model is according to one of OSI (Open Systems Interconnection) and TCP/IP (Transmission Control Protocol/Internet Protocol); and forwarding, by said gateway system, said packet to said digital system on said network only if applying said first policy on said packet determines to forward said packet on said network, followed by applying said second policy on said packet determines to forward said packet on said network.

11. The gateway system of claim 10,
wherein said higher layer is an application layer and said lower layer is one of a presentation layer, a session layer, a transport layer, a network layer, a data link layer and a physical layer according to said networking model,
wherein said network is a zero trust network.

12. The gateway system of claim 10, further comprising:
in response to receiving said packet, performing a first iteration of said identifying and said applying to identify and apply a first set of higher-layer policies including said first policy;
redirecting said packet to said gateway system if it is determined to permit access to said first resource based on applying said first set of higher-layer policies;
in response to receiving said redirected packet, performing a second iteration of said identifying and said applying to identify and apply a second set of lower-layer policies including said second policy; and
performing said forwarding if it is determined to permit access to said first resource based on applying said second set of lower-layer policies.

13. The gateway system of claim 12, wherein said packet is received according to a first network protocol at a first port of said gateway system,
wherein said redirecting redirects said packet according to a second network protocol,
wherein said redirected packet is received at a second port of said gateway system.

14. The gateway system of claim 13, wherein said gateway system is a reverse proxy,
wherein a first listener process listens on said first port according to said first network protocol, performs said first iteration and performs said redirecting,
wherein a second listener process listens on said second port according to said second network protocol, performs said second iteration and performs said forwarding,
wherein said second network protocol facilitates inter-process communication,
wherein said redirecting is achieved in-memory using said first listener process, said second listener process and said second network protocol.

15. The gateway system of claim 12, wherein said gateway system comprises a policy device and a network device,
wherein said packet is received at said network device,
wherein said packet is sent to said policy device by said network device,
wherein said policy device performs said first iteration in response to receiving said packet,
wherein said redirecting redirects said packet to said network device,
wherein said network device sends said redirected packet to said policy device,
wherein said policy device performs said second iteration in response to receiving said redirected packet,
wherein said policy device forwards said packet to said network if it is determined to permit access to said first resource.

16. The gateway system of claim 12, further comprising:
invoking a first application service after performing said first iteration, wherein said redirecting is performed upon completion of execution of said first application service; and invoking a second application service after performing said second iteration, wherein said forwarding is performed upon completion of execution of said second application service.

17. The gateway system of claim 12, further comprising:
after performing said first iteration, said forwarding forwards said packet to a higher-layer load balancer,
wherein after performing said second iteration, said forwarding forwards said packet a lower-layer load balancer,
whereby load balancing is achieved at both higher-layer and lower-layer.

18. A non-transitory machine readable medium storing one or more sequences of instructions for causing a gateway system to control access to resources in networks, wherein execution of said one or more instructions by one or more processors contained in said gateway system causes performance of the actions of:
maintaining a policy data specifying a respective plurality of policies for corresponding resources, wherein each policy of said plurality of policies specifies a condition and whether to allow or deny access to the corresponding resource upon satisfying of said condition;
receiving by said gateway system from an end user system, a packet requesting access to a first resource in a network;
identifying from said policy data, a first plurality of policies based on a form of text contained in said packet, said text being comprised in a URL (Universal Resource Locator) or a URI (Uniform Resource Identifier) uniquely identifying said first resource in said packet;
applying, by said gateway system, on said packet a first policy and then a second policy to determine whether or not to forward said packet to said network, wherein said first policy and said second policy are comprised in said first plurality of policies, wherein said first policy and said second policy are respectively at a higher-layer and a lower-layer of a stack of layers defined according to a networking model,
wherein said networking model is according to one of OSI (Open Systems Interconnection) and TCP/IP (Transmission Control Protocol/Internet Protocol); and
forwarding, by said gateway system, said packet to said digital system on said network only if applying said first policy on said packet determines to forward said packet on said network, followed by applying said second policy on said packet determines to forward said packet on said network.

19. The non-transitory machine readable medium of claim 18, wherein said higher layer is an application layer and said lower layer is one of a presentation layer, a session layer, a transport layer, a network layer, a data link layer and a physical layer according to said networking model, and wherein said network is a zero trust network.

20. The non-transitory machine readable medium of claim 19, further comprising:
in response to receiving said packet, performing a first iteration of said identifying and said applying to identify and apply a first set of higher-layer policies including said first policy;
redirecting said packet to said gateway system if it is determined to permit access to said first resource based on applying said first set of higher-layer policies;
in response to receiving said redirected packet, performing a second iteration of said identifying and said applying to identify and apply a second set of lower-layer policies including said second policy; and performing said forwarding if it is determined to permit access to said first resource based on applying said second set of lower-layer policies.

\* \* \* \* \*